United States Patent
Berberich et al.

(10) Patent No.: US 6,989,736 B2
(45) Date of Patent: Jan. 24, 2006

(54) MONITORING DEVICE FOR A MOTOR VEHICLE

(75) Inventors: Wolfgang Berberich, Freudenberg (DE); Edwin Seitz, Stadtprozelten (DE); Tim Weis, Bensheim (DE)

(73) Assignee: Donnelly Hohe GmbH & Co. KG, Collenberg (DE)

( * ) Notice: Subject to any disclaimer, the term of this patent is extended or adjusted under 35 U.S.C. 154(b) by 100 days.

(21) Appl. No.: 10/669,785

(22) Filed: Sep. 24, 2003

(65) Prior Publication Data

US 2004/0056955 A1    Mar. 25, 2004

(30) Foreign Application Priority Data

Sep. 25, 2002  (DE)  ............ 202 14 892 U

(51) Int. Cl.
*B60Q 1/00*  (2006.01)

(52) U.S. Cl. .......... 340/425.5; 340/937; 340/436; 348/68

(58) Field of Classification Search ........ 340/425.5, 340/937, 436, 487, 686.6, 932.1, 933, 438; 348/68, 148, 149, 153
See application file for complete search history.

(56) References Cited

U.S. PATENT DOCUMENTS

| | | | | |
|---|---|---|---|---|
| 5,027,200 A | * | 6/1991 | Petrossian et al. | 348/118 |
| 5,574,443 A | * | 11/1996 | Hsieh | 340/901 |
| 5,680,123 A | * | 10/1997 | Lee | 340/937 |
| 6,476,855 B1 | | 11/2002 | Yamamoto | 348/148 |
| 2002/0041760 A1 | | 4/2002 | Ellinger et al. | 396/419 |
| 2002/0113415 A1 | | 8/2002 | Pochmuller | 280/727 |

FOREIGN PATENT DOCUMENTS

| | | |
|---|---|---|
| DE | 199 23 964 | 12/1999 |
| DE | 199 45 588 | 4/2001 |
| DE | 199 47 766 | 5/2001 |
| DE | 100 13 425 | 9/2001 |
| DE | 100 47 066 | 4/2002 |
| DE | 100 50 002 | 5/2002 |
| DE | 100 49 786 | 6/2002 |

* cited by examiner

*Primary Examiner*—Phung T. Nguyen
(74) *Attorney, Agent, or Firm*—McGlew & Tuttle, P.C.

(57) ABSTRACT

The invention relates to a monitoring device (1) for a motor vehicle (2), consisting of at least one display device (6) located in the interior of the vehicle, and at least one camera (4, 5) arranged in the front and/or rear area of the vehicle (2), with which the area to the sides of the vehicle (2) can be monitored and displayed on the display device (6), whereby the camera (4, 5) is arranged on a carrier unit located centrally on the vehicle (2), and whereby the carrier unit can be withdraw into the bodywork when not in use and can be extended when required.

19 Claims, 4 Drawing Sheets

MONITORING DEVICE FOR A MOTOR VEHICLE

FIELD OF THE INVENTION

The invention relates to a monitoring device for a motor vehicle having at least one display device located in an interior of the vehicle and at least one camera located on the exterior of the vehicle providing images to the display device.

BACKGROUND OF THE INVENTION

Safety measures are known for a motor vehicle to drive into and out of a parking space, for example. Sensors which are accommodated in the bodywork of the vehicle determine with the aid of an evaluation and/or control electronics unit the distance to the nearest object and convert this information into a visual and/or audible signal. The driver of the vehicle is in this way warned of possible obstacles.

A monitoring device for motor vehicles is known from DE 100 50 002 A1. This monitoring device features a display unit in the driver's field of vision in order to display the picture taken with the video camera. These video cameras are arranged laterally in the front and/or rear area of the vehicle. They are either integrated into the headlamps or fitted in a position close to them, and cover a transfer range which extends over an angle range from 30° to 120° between a beam running parallel to the longitudinal axis and directed to the front or rear respectively in the horizontal plane.

The video cameras themselves may be mounted and/or driven independently of one another, in pairs, or jointly.

A disadvantage with the systems known hitherto is that the monitoring devices are in most cases mounted in the comer impact areas of the vehicles, which are expensive to repair and are therefore inadequately protected. Because the comer area of a motor vehicle is almost always involved if a vehicle suffers an accident, in particular in unforeseeable or unexpected situations, it is recommended that the monitoring device be integrated at another part of the vehicle bodywork. In addition to this, with the previously-known systems, four camera units are required, namely at all four comers of the vehicle, in order to provide an adequate coverage range in front of and behind the vehicle.

SUMMARY OF THE INVENTION

Taking this as the prior art, the object of the present invention is to propose a new monitoring device for motor vehicles.

This objective is achieved by mans of a monitoring device according to the teaching of claim 1.

One advantage of the monitoring device according to the invention is that the camera is arranged on a carrier unit located in the center of the vehicle, whereby the carrier unit is withdrawn into the bodywork when not in use, and extended when required. Since the carrier unit is located in the center, both the right-hand area and the left-hand area of the vehicle can be overlooked, so that monitoring all four comers does no longer require four mounting locations at the vehicle. Instead the arrangement according to the invention makes it possible to overlook all four comers with only one mounting location at the front and rear of the vehicle respectively.

In this situation, the carrier unit is for preference integrated into the bumper of the vehicle, in order to protect it from damage. By means of this arrangement, damage to the monitoring device can be avoided in the event of accidents involving the comer impact areas. Here embodiments are conceivable in which the carrier unit can be arranged so as to be flexible or de-mountable so that in the case of an impact on the center of the bumper the camera can be protected by the carrier unit retreating into a protective area provided for this purpose.

With a control unit located in the interior of the vehicle, a selection can be made as to whether the monitoring device should be activated. It is thus possible to provide in the interior of the vehicle an actuating device, for example a hand-actuated switch, by means of which the system may be activated. Alternatively or in addition to this the system may also be activated automatically as a function of suitable parameters. It is for example conceivable to activate the system automatically whenever the driver puts the vehicle into reverse gear or the speed of the vehicle drops below a certain level.

If not in use, the camera remains in its basic setting and is therefore protected against all influences outside the vehicle. There is the possibility of providing the carrier unit with a protection mechanism with which the carrier unit can be locked in at least its designated position of rest in order to provide protection against damage and theft. It is also conceivable, however, that the monitoring device can be linked to the ignition and is therefore automatically activated when the engine is turned on, and, when the engine is turned off, pivots back into its basic setting and locks in place.

The camera is arranged for easier operation on a carrier unit and can therefore, if necessary, be moved in and out as one unit. The carrier unit itself is secured in the bumper and mounted on bearings such as to be rotatable about an axis. This has the advantage that, during maintenance work or in the event of damage the carrier unit cart be removed from the bumper as a complete unit, and elaborate dismantling work, such as arises, for example, with the integration of the camera in the headlamps, can be avoided. In this context it should be mentioned that the carrier unit can be integrated into the bumper in such a way that the appearance of the vehicle and of the bumper is not influenced.

The camera which is secured on the carrier unit is, for preference, a high-resolution CCD color micro-head camera, which can be connected to a separate control unit. In a particularly advantageous embodiment, the camera is capable of processing light signals in the infra-red range. It is also conceivable, however, for the monitoring device to be provided, if required, with an additional lighting device, which could be mounted on the carrier unit of the monitoring device. This lighting unit could likewise be operated by means of the control unit located inside the vehicle.

In order for the carrier unit to be arranged centrally, in particular in the bumper of the vehicle, the carrier unit is designed in such a way that two cameras can be placed on it. In this situation it is conceivable that the left-hand camera overlooks the left-hand area of the vehicle and the right-hand camera overlooks the right-hand area. This applies both to the front as well as to the rear of the vehicle. Naturally, other circuit arrangements or connection links of the camera are also conceivable.

The image transmitted by the cameras is transferred to a display device located in the interior of the vehicle. This display device can be designed in the manner of a navigation display. In this situation, the image transmitted by the cameras can be split into a left-hand and right-hand area for representation on the display device. Naturally, other forms of representation are also conceivable.

With the appropriate layout, it is also conceivable for the monitoring device to be used as a parking aid, in order to represent the delimitations of a parking space.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
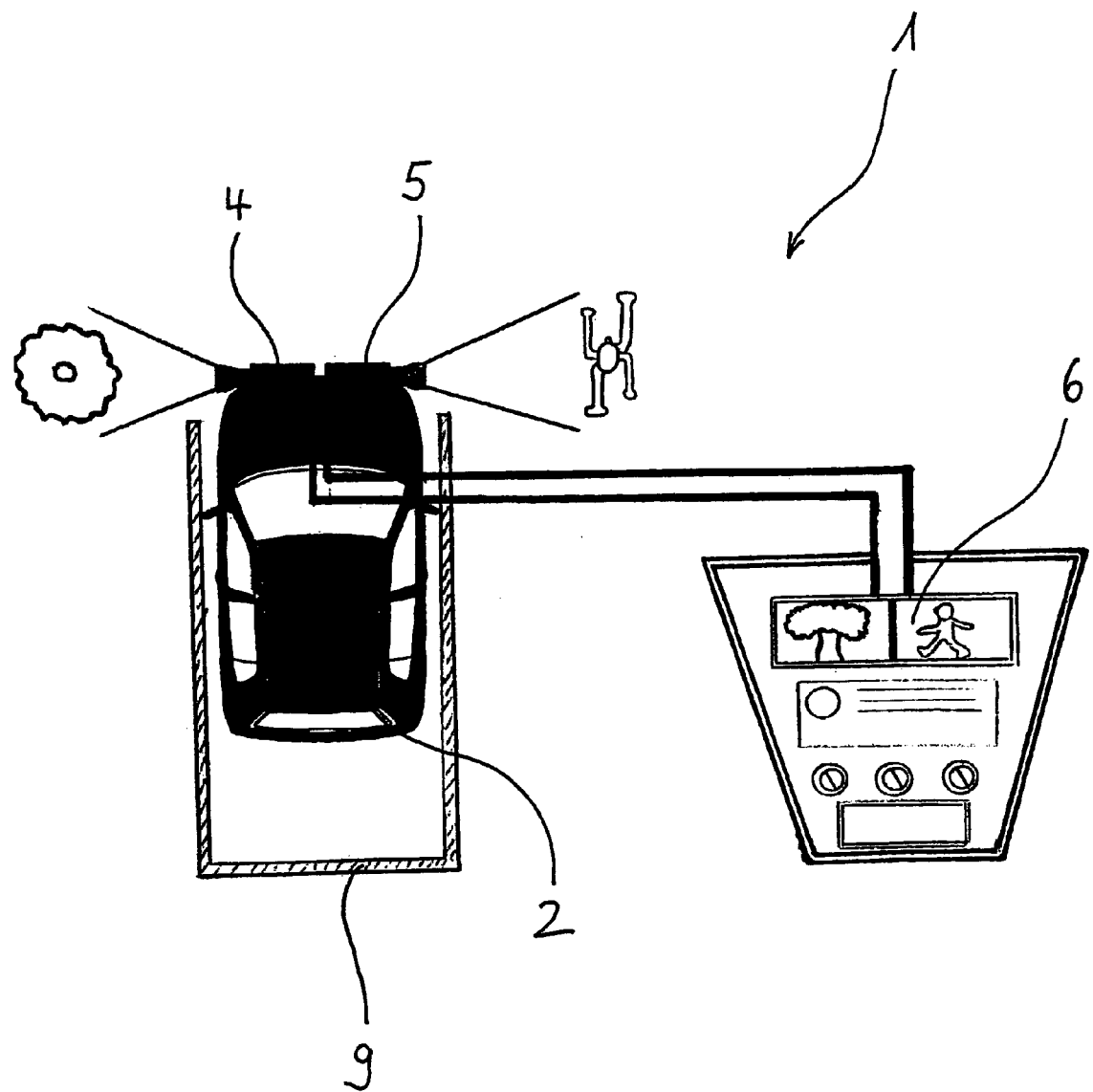
FIG. 1 is a representation of the function principle of the monitoring device.

Referring to the drawings in particular, FIG. 1 shows a schematic representation of the monitoring device 1. As represented in the drawing by way of example, a driver of the vehicle 2, when driving out of a car park 9, has no possibility of viewing the areas to the left and right adjacent to his vehicle 2 without assistance. For this reason, two cameras 4 and 5 are secured to the front part of the vehicle 2, which are capable of transferring an image to the interior of the vehicle 2. This image is represented on a display device 6.

The display device 6 may be a navigation display which is integrated in the dashboard. The image transferred from the two cameras 4 and 5 is represented split on this navigation display. In this situation, the image from the left-hand camera 4 is displayed in the left half of the navigation display and the image from the right-hand camera 5 is displayed in the right half. Naturally, other transfer modes are conceivable, but are not explained here in any greater detail.

Figure 2:
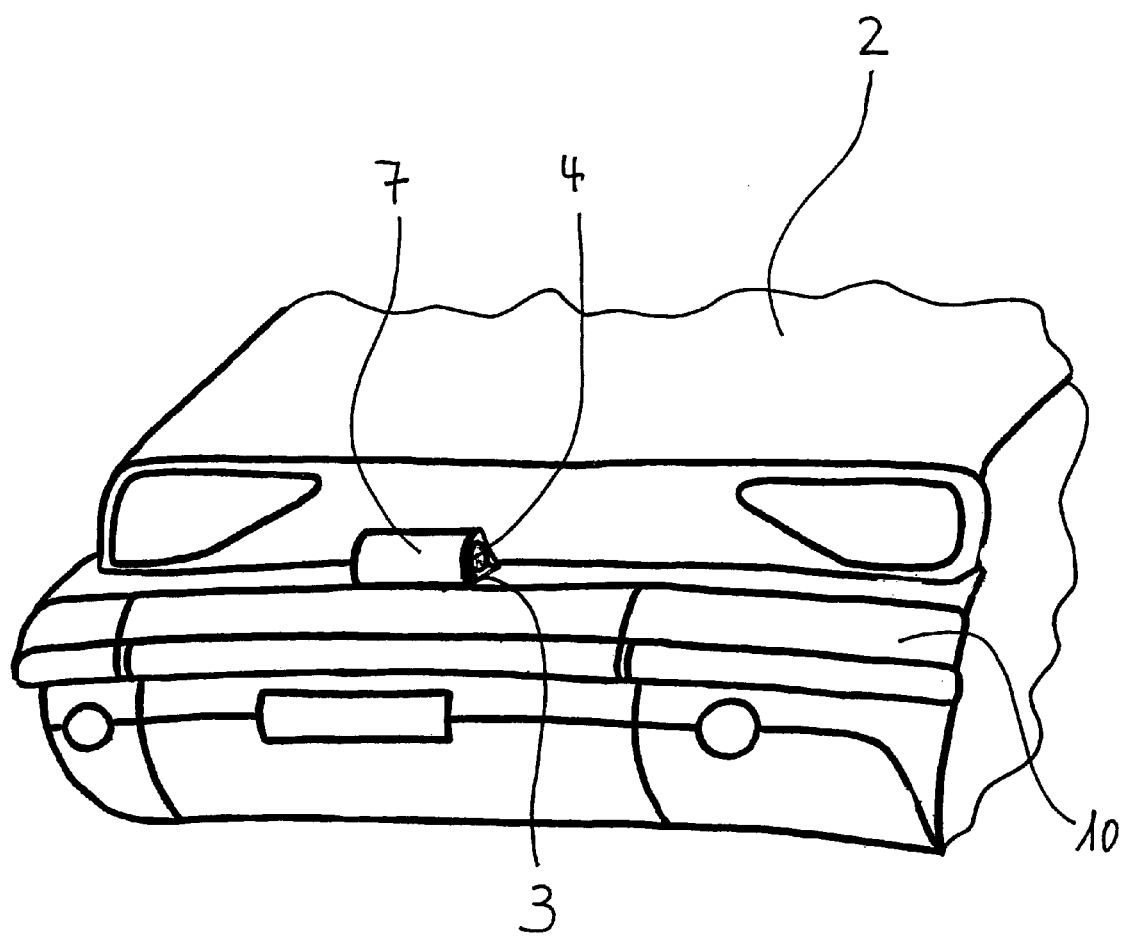
FIG. 2 is a perspective view of an embodiment of the carrier unit integrated into the bumper of a motor vehicle.

FIG. 2 shows the carrier unit 7 of the monitoring device 1 on a motor vehicle 2 which is represented schematically. It can be seen that the carrier unit 7 is arranged centrally on the bumper 10, and in this representation is located in the extended position, i.e. the operating position. Likewise it can clearly be seen how little installation space is required for the carrier unit 7.

Figure 3:
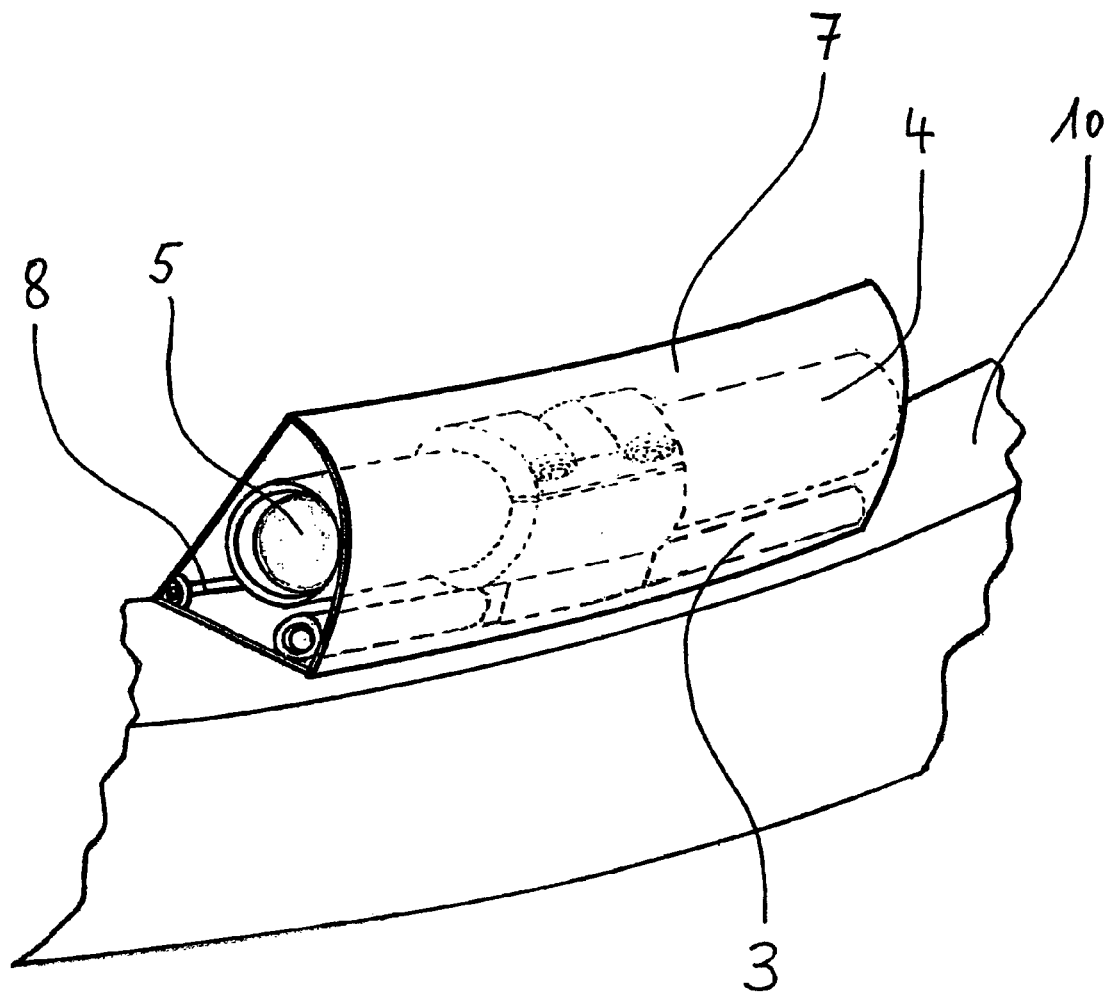
FIG. 3 is a perspective view of the carrier unit according to FIG. 2 in an enlarged representation.

FIG. 3 shows the carrier unit 7 in an enlarged representation. The carrier unit 7 is in the operating position and is extended out of its basic position. The two cameras 4 and 5 and the lighting device 3 can likewise be seen. The cameras 4 and 5 are arranged on the carrier unit 7, which is turn is mounted on an axis 8 such as to be pivotable. Accordingly, the monitoring device 1 can be pivoted from the operating position into its basic (retracted) position. Likewise located on the carrier unit 7 is the lighting unit 3, which, depending on the conditions inside a building (multi-story carpark with varying degrees of lighting or no lighting at all) or outside (darkness), provides the two cameras 4 and 5 with an additional light source. It is conceivable that the lighting device 3 consists of LED luminescent elements.

Figure 4:
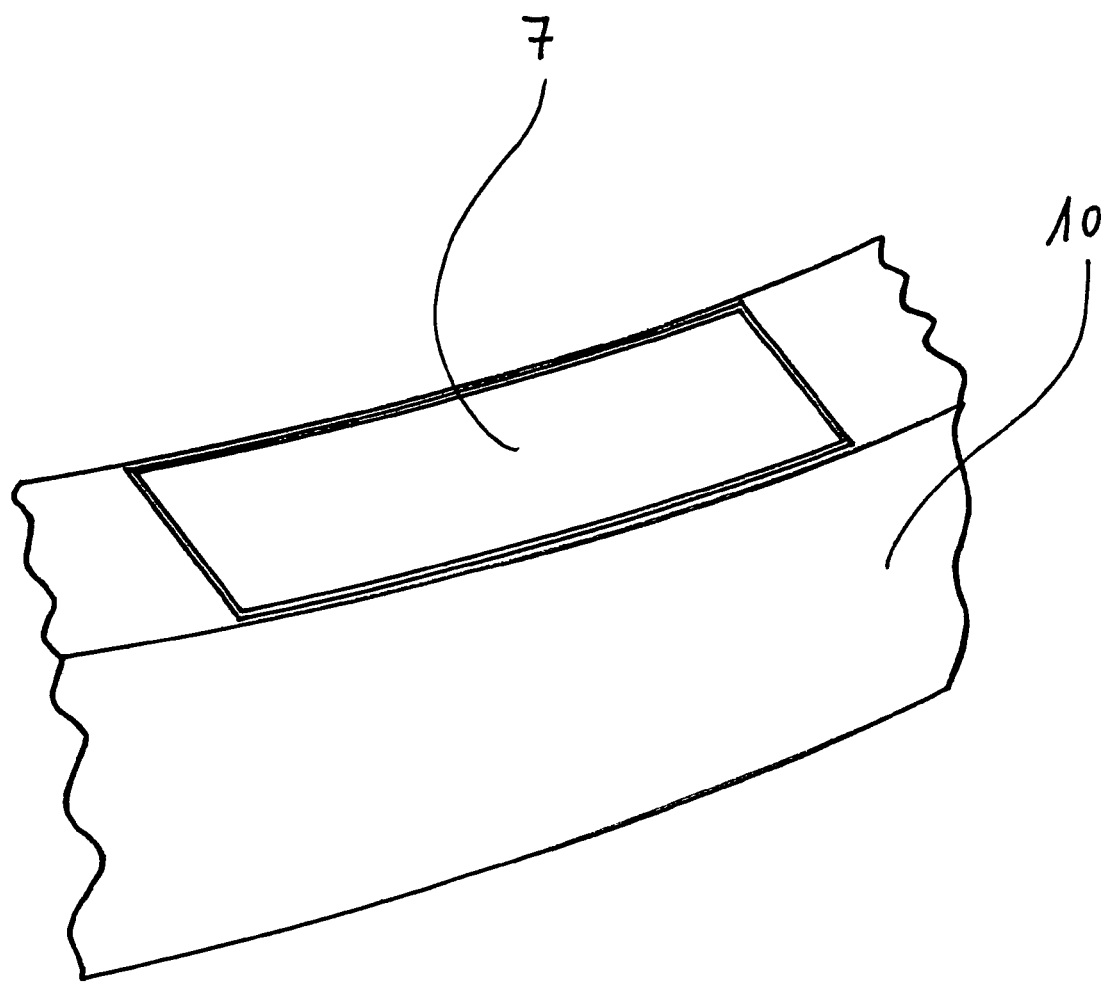
FIG. 4 is a perspective view of the carrier unit according to FIG. 3 in its basic position.

FIG. 4 shows the carrier unit 7 in its basic position. As can be seen, the upper edge of the carrier unit 7 closes flush with the upper edge of the bumper 10. In the basic position, the carrier unit 7 is automatically locked from the inside and is therefore protected against external influences.

While specific embodiments of the invention have been shown and described in detail to illustrate the application of the principles of the invention, it will be understood that the invention may be embodied otherwise without departing from such principles.

What is claimed is:

1. A monitoring device for a motor vehicle having a front bumper and having an interior cabin, the device comprising:
   at least one display device located in the interior cabin of the vehicle;
   the front bumper including a carrier unit;
   said carrier unit including a first camera having a field of view of a first area to the left adjacent the vehicle and a second camera having a field of view of a second area to the right adjacent the vehicle;
   said carrier unit adapted to pivot from an operating position to a retracted position;
   said first and second cameras being above the front bumper when said carrier unit in said operating position;
   said first and second cameras being within the front bumper when said carrier unit is in said retracted position;
   said sides of the vehicle observed by said first and second cameras when said carrier unit pivots to said operating position;
   images captured by said first and second cameras when in said operating position displayed on the display device;
   said carrier unit pivotally moving from said operating position to said retracted position when said side views are not desired; and
   wherein the monitoring device interacts with a lighting device.

2. The monitoring device according to claim 1, wherein said carrier unit is substantially flush with the bumper of the vehicle when in said retracted position.

3. The monitoring device according to claim 1, wherein said carrier unit is mounted on bearings so as to be rotatable about an axis.

4. The monitoring device according to claim 1 wherein said first and second cameras are CCD cameras.

5. The monitoring device according to claim 1, wherein the carrier unit can at least be locked into a position of rest in order to provide protection against damage or theft.

6. The monitoring device according to claim 1, wherein said carrier unit is centrally located on said front bumper.

7. The monitoring device according to claim 1, wherein image data transferred by said first and second cameras can be displayed next to one another in two areas on the display device.

8. The monitoring device according to claim 1, wherein the lighting device is arranged on the carrier unit.

9. The monitoring device according to claim 1, wherein said first and second cameras are capable of processing light signals in an infra-red range.

10. The monitoring device according to claim 1, wherein the display device is a navigation display.

11. The monitoring device according to claim 1, wherein the monitoring device is equipped with a control device, with which the extension and retraction of said carrier unit or a lighting device respectively can be controlled and/or regulated.

12. The monitoring device according to claim 1, wherein the monitoring device can be used when driving out of a car park.

13. A monitoring device for a motor vehicle having a front bumper and having an interior cabin, the device comprising:
- at least one display device located in the interior cabin of the vehicle;
- the front bumper including a carrier unit;
- said carrier unit including at least one camera having a field of view of a first area to the left adjacent the vehicle and having a field of view of a second area to the right adjacent the vehicle;
- said carrier unit adapted to rotate about an axis from an operating position to a retracted position;
- said at least one camera being above the front bumper when said carrier unit is in said operating position;
- said at least one camera being within the front bumper when said carrier unit is in said retracted position;
- said sides of the vehicle observed by said at least one camera when said carrier unit pivots to said operating position;
- images captured by said at least one camera when in said operating position displayed on the display device;
- said carrier unit pivotally moving from said operating position to said retracted position when said side views are not desired; and
- wherein said carrier unit is substantially flush with the bumper of the vehicle when in said retracted position.

14. The monitoring device according to claim 13, characterized in that said carrier unit is mounted on bearings so as to be rotatable about an axis.

15. The monitoring device according to claim 13, wherein the carrier unit can at least be locked into a position of rest in order to provide protection against damage or theft.

16. The monitoring device according to claim 13, wherein said carrier unit is centrally located on said front bumper.

17. The monitoring device according to claim 13, wherein the monitoring device can be used when driving out of a car park.

18. A monitoring device for a motor vehicle having a front bumper with an upper surface, the vehicle having an interior cabin, the device comprising:
- a display device located in the interior cabin;
- a pivot axis connected to the bumper;
- a carrier unit with an upper edge surface and a first side open region and a second side open region, said carrier unit being mounted to the front bumper via said pivot axis for pivoting movement between an operating position, with said upper edge surface raised relative to the upper surface of the front bumper, with said first side open region facing a first area adjacent to the first side of the vehicle and with said second side open region facing a second area adjacent to the second side of the vehicle and a retracted position with said upper edge surface substantially flush with the upper surface of the front bumper;
- a first camera supported by said carrier unit and movable with said carrier unit to a position above the front bumper with a field of view of said first area when said carrier unit is in said operating position and to a position within the front bumper when said carrier unit is in said retracted position, said first camera being operatively connected to said display device for displaying images captured by said first camera when said carrier unit is in said operating position;
- a second camera supported by said carrier unit and movable with said carrier unit to a position above the front bumper with a field of view of said second area when said carrier unit is in said operating position and to a position within the front bumper when said carrier unit is in said retracted position, said second camera being operatively connected to said display device for displaying images captured by said second camera when said carrier unit is in said operating position.

19. The monitoring device according to claim 18, wherein the carrier unit is locked in said retracted position in order to provide protection against damage or theft.

* * * * *